April 21, 1953     T. M. PRUDDEN     2,635,283
LOBSTER PLUG
Filed June 24, 1950
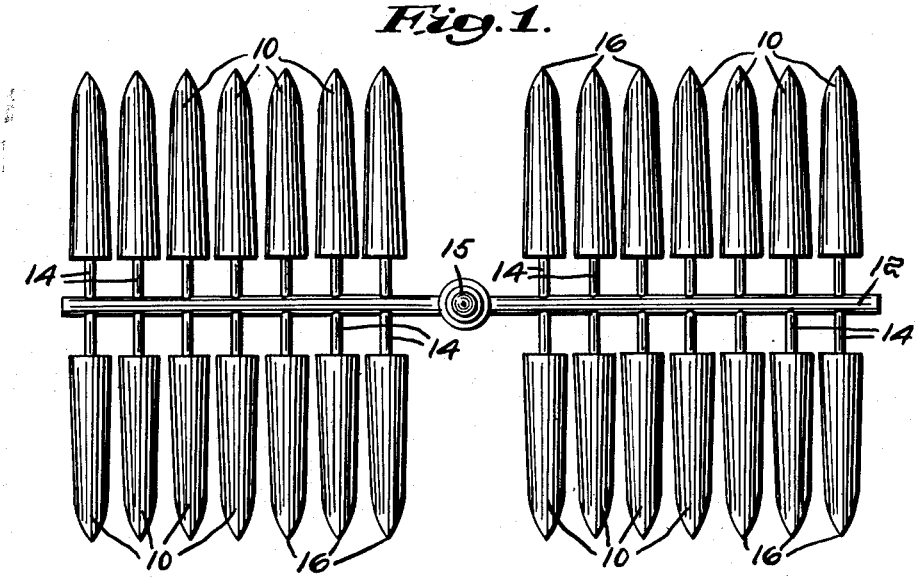
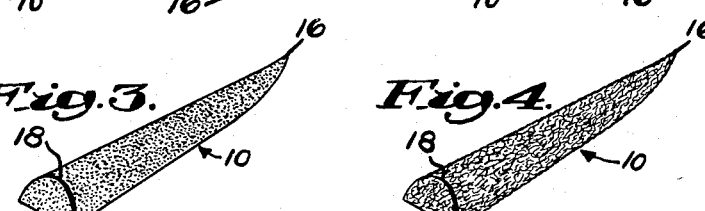
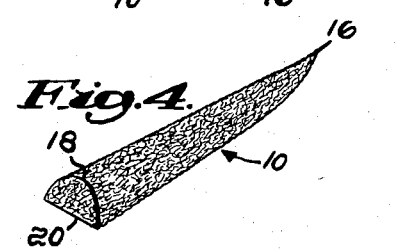
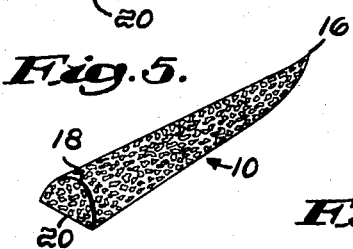
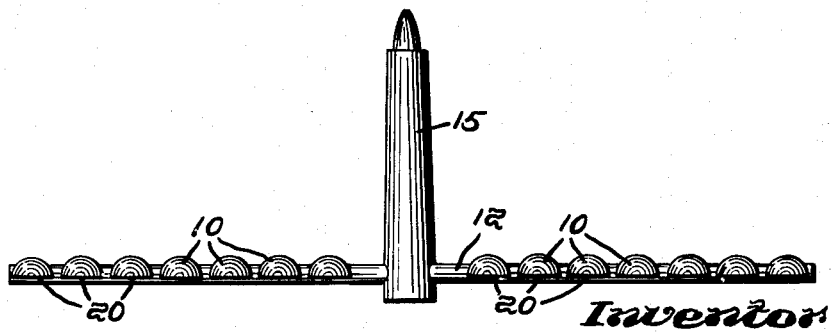
Inventor:
Theodore M. Prudden,
by Kenway, Jenney, Witter & Hildreth
Attorneys Patented Apr. 21, 1953

2,635,283

UNITED STATES PATENT OFFICE 2,635,283

LOBSTER PLUG

Theodore M. Prudden, Hingham, Mass.

Application June 24, 1950, Serial No. 170,177

7 Claims. (Cl. 17—1)

This invention relates to lobster plugs employed as stoppers at the claw joints for preventing lobsters from operating their claws and thus injuring each other. Heretofore wood plugs have been largely used for this purpose. Injury caused by insertion of the plug results in infection in the flesh of the claw and a consequent blackening of the meat surrounding the plug, thereby rendering it objectionable and distasteful. My invention, disclosed herein, embodies an improved lobster plug molded from plastic composition compounded to remedy this objection. I have discovered that this black and objectionable meat will adhere to a lobster plug molded from certain plastic compositions selected to soften well below the boiling point of the water in which the lobsters are cooked, and when the plugs are removed the adhering blackened meat remains sticking to and is removed with the plugs. Thus my invention does not eliminate the infection or this objectionable dark meat but it does provide a convenient means for removing the discolored meat. The production of an improved lobster plug of this nature comprises the primary object of the invention.

The known molding plastics produce smooth and slick exterior surfaces and a lobster plug having such surface would not remain securely in place in the claw. A further feature of the invention resides in the production of a lobster plug of the above described nature having a rough exterior surface providing frictional holding contact with an engaging surface whereby the plug will remain in operative position in the claw.

These and other objects and features of my invention hereinafter described will be more readily understood and appreciated from the following detailed description of preferred embodiments thereof selected for purposes of illustration and shown in the accompanying drawing in which—

Fig. 1 is a plan view of a block of lobster plugs molded in accordance with my invention, Fig. 2 is a side elevation thereof, Fig. 3 illustrates one of my lobster plugs provided with a roughened exterior surface caused by abrasive action thereon, Fig. 4 illustrates one of the plugs having a roughened exterior surface caused by the addition of a filler material bonded into and extending to the surface of the plug, Fig. 5 illustrates one of the plugs having a rough and scaly exterior surface caused by the addition of moisture to the plastic composition prior to molding, and Fig. 6 illustrates one of the plugs serrated at its two edges to provide a rough exterior holding surface.

The block of lobster plugs 10 illustrated in Fig. 1 of the drawing is formed in a mold and includes a core 12 with branches 14 and having a terminal end 15. The plugs 10 break freely from the branches 14 when the block is removed from the mold. Each plug comprises a relatively long body tapering from a relatively large end to a point 16 at the other end and substantially D-shaped in cross section, thus providing an arcuate face 18 at one side and a substantially flat face 20 at the other side. The end 16 is preferably slightly curved toward the arcuate face as illustrated.

The plastic compositions which I have thus far employed and found most desirable for the purpose described are ethyl cellulose and cellulose acetate. At normal room temperature, lobster plugs made from these compositions are sufficiently hard to retain the shape illustrated in the drawing. However, when subjected to heat, these plugs soften substantially below the boiling temperature of water and soften sufficiently under 170° F. to perform the desired function of the invention. I have found that such compositions as thus soften between 140° F. and 170° F. are quite satisfactory for the purpose described.

Molded plastics inherently produce smooth and glossy exterior surfaces and this characteristic is ordinarily highly desirable in molded products. However, in the case of my improved lobster plug this characteristic is undesirable and would render the plug useless since it would not stay in place in the claw. For this reason, I give the molded plugs a further treatment to provide a rough exterior surface adapted to make frictional holding contact with the claw and thus hold the plugs securely in place. Furthermore, the darkened lobster meat clings much more readily to this roughened surface than to the smooth surface produced by molding and the roughened frictional surface is therefore a considerable factor in serving the additional function of removing the objectionable darkened meat. In the drawing I have illustrated various forms of treatment to effect this characteristic and function. It should furthermore be understood that a roughening of the molding die would not serve this desired purpose since a surface of plastic composition molded in such a die would still be smooth and slippery, similar to ribbed window glass molded in a ribbed die.

The plug shown in Fig. 3 has its exterior surface pitted and scratched by abrasive action thereon. This treatment is conveniently and economically effected by tumbling the molded plugs in a barrel lined with emery paper and/or including loose emery therein. Such treatment scratches and pits the glossy surface much as the sand blasting of glass removes the slippery surface, and provides a roughened frictional surface. Also some particles of the emery embed themselves in the plug and thus add to the frictional characteristic.

The plug shown in Fig. 4 contains a filler material, such as sawdust, asbestos, cotton fibres, an abrasive, etc., bonded into and extending to the surface of the plug to form a rough exterior surface. The outwardly extending portions of the filler provide a multitude of frictional areas which quite adequately serve the frictional function.

The plug shown in Fig. 5 has a rough exterior surface embodying scaly areas caused by the addition of moisture to the plastic composition prior to molding. Ordinarily, great care is taken to dry out ethyl cellulose and cellulose acetate plastic composition before using, since moisture gives a scaly or crackled surface to the molded product, whereas a smooth and glossy surface is usually desired. In accordance with my invention, a predetermined amount of moisture up to 5% is absorbed into the plastic composition before molding and this causes the rough and crackled surface desired in my product.

The plug shown in Fig. 6 is provided with a series of fine serrations or barbs 22 on and along the two side margins, preferably formed as kerfs or saw teeth facing rearwardly, whereby preventing rearward movement of the plug but permitting its forward movement into the claw. The teeth will ordinarily be finer than illustrated in Fig. 6.

My discovery that lobster flesh will adhere to a lobster plug of certain plastic compositions which soften when the lobster is cooked is of primary importance to my invention. Just why this occurs is not known but it is known that certain plastics soften, i. e. reach "heat distortion temperature" when subjected to boiling water, and I have definitely determined that when plugs molded from these selected plastics are softened in hot water they effect the adhesion referred to and the removal of the discolored and undesirable meat with the plug. By employing this discovery together with other of the treatments herein described, I have produced a substantially superior lobster plug of the character and having the functions defined.

Having thus disclosed my invention what I claim as new and desire to secure by Letters Patent is:

1. A molded lobster plug substantially D-shaped in cross section and adapted to be employed as a stopper in the claw joints of a live lobster for preventing the lobster from injuring other lobsters, comprising a relatively long body tapering from a relatively large end to a point at the other end and embodying plastic composition of a member of the group consisting of ethyl cellulose and cellulose acetate which softens and becomes adhesive when subjected to hot water in which the lobster is cooked.

2. The lobster plug defined in claim 1 in which the molded exterior surface of the plug is rough.

3. The lobster plug defined in claim 2 in which the rough exterior surface of the plug has abrasively-formed pits and scratches.

4. The lobster plug defined in claim 1 in which the plastic composition is compounded to soften between 140° F. and 170° F.

5. The lobster plug defined in claim 1 plus a filler material bonded into and extending outwardly to the surface of the plug to form a rough exterior holding surface.

6. The lobster plug defined in claim 1 in which the molded exterior surface of the plug embodies rough scaly and crackled areas.

7. The lobster plug defined in claim 1 plus transverse serrations on the exterior surface of the plug.

THEODORE M. PRUDDEN.

References Cited in the file of this patent

UNITED STATES PATENTS

| Number | Name | Date |
|---|---|---|
| 420,531 | Corey | Feb. 4, 1890 |
| 812,189 | Dorr | Feb. 13, 1906 |
| 1,429,500 | Frease | Sept. 19, 1922 |
| 1,468,125 | Nielsen | Sept. 18, 1923 |